Feb. 11, 1930. W. E. WINE Re. 17,590
FREIGHT CAR
Original Filed May 23, 1927 7 Sheets-Sheet 1
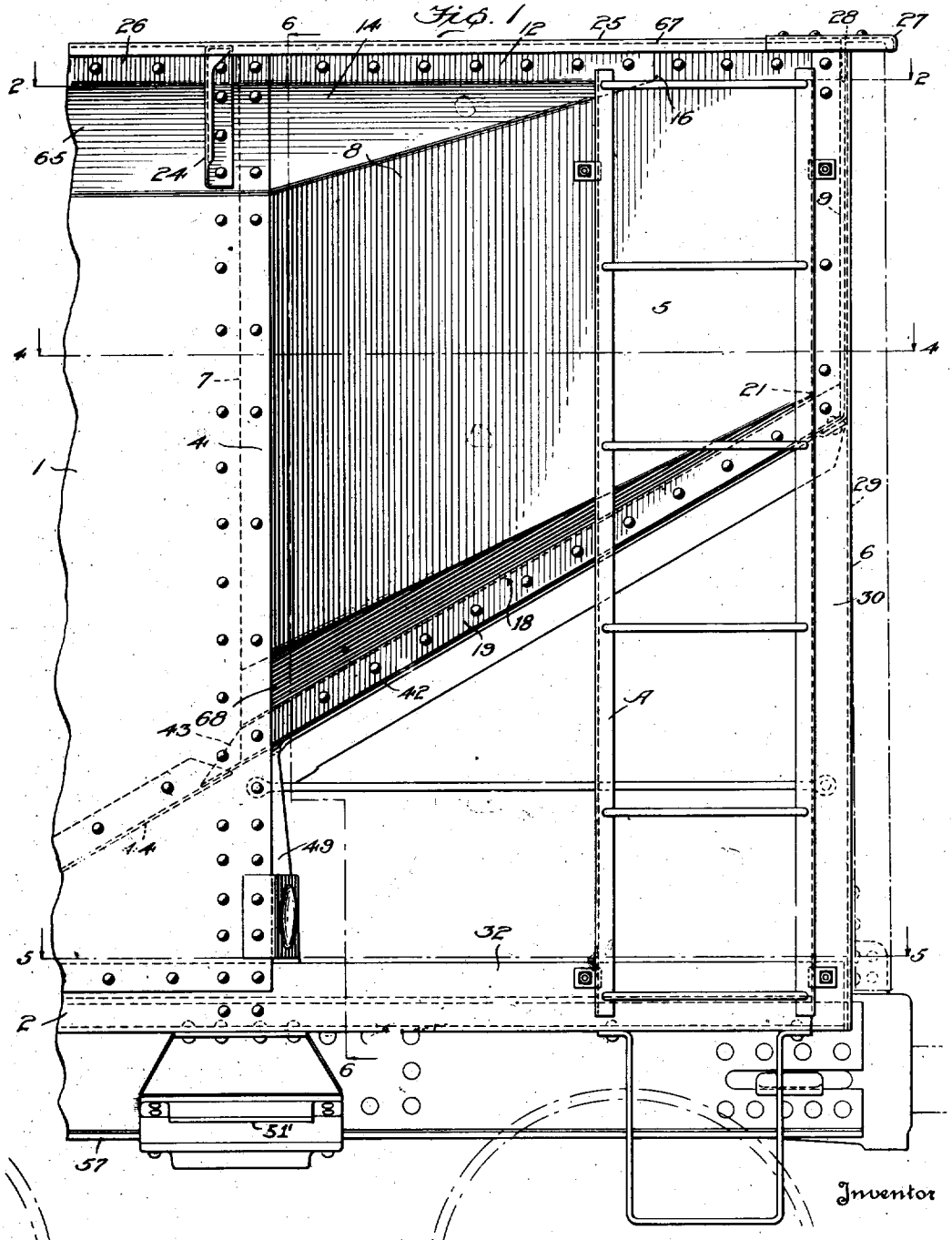
Inventor
William E. Wine
By Ritter & Mechlin
his Attorneys Feb. 11, 1930. W. E. WINE Re. 17,590.
FREIGHT CAR
Original Filed May 23, 1927 7 Sheets-Sheet 2
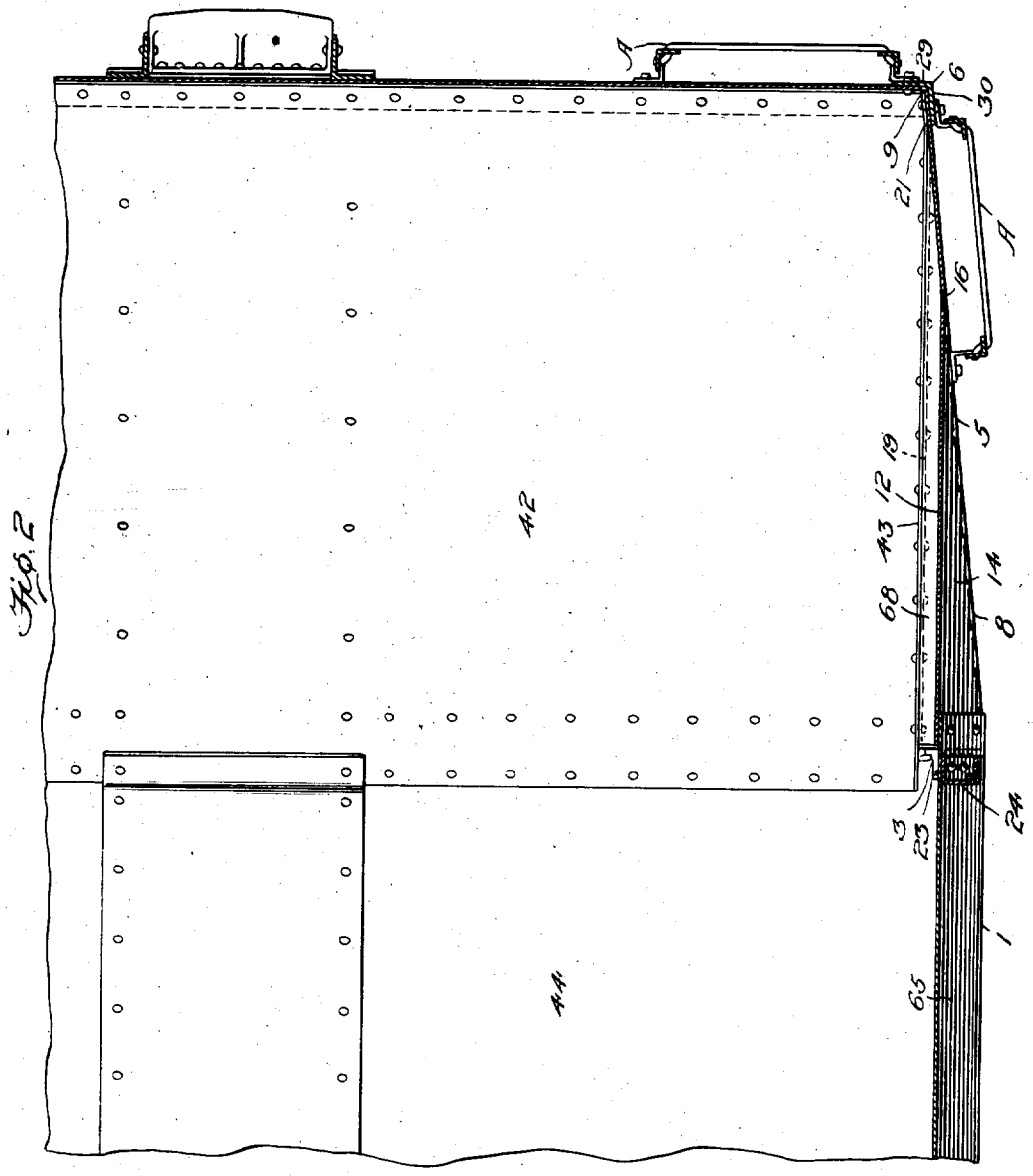
Inventor
William E. Wine
By Ritter & Meachin
his Attorneys Feb. 11, 1930. W. E. WINE Re. 17,590
FREIGHT CAR
Original Filed May 23, 1927 7 Sheets-Sheet 3
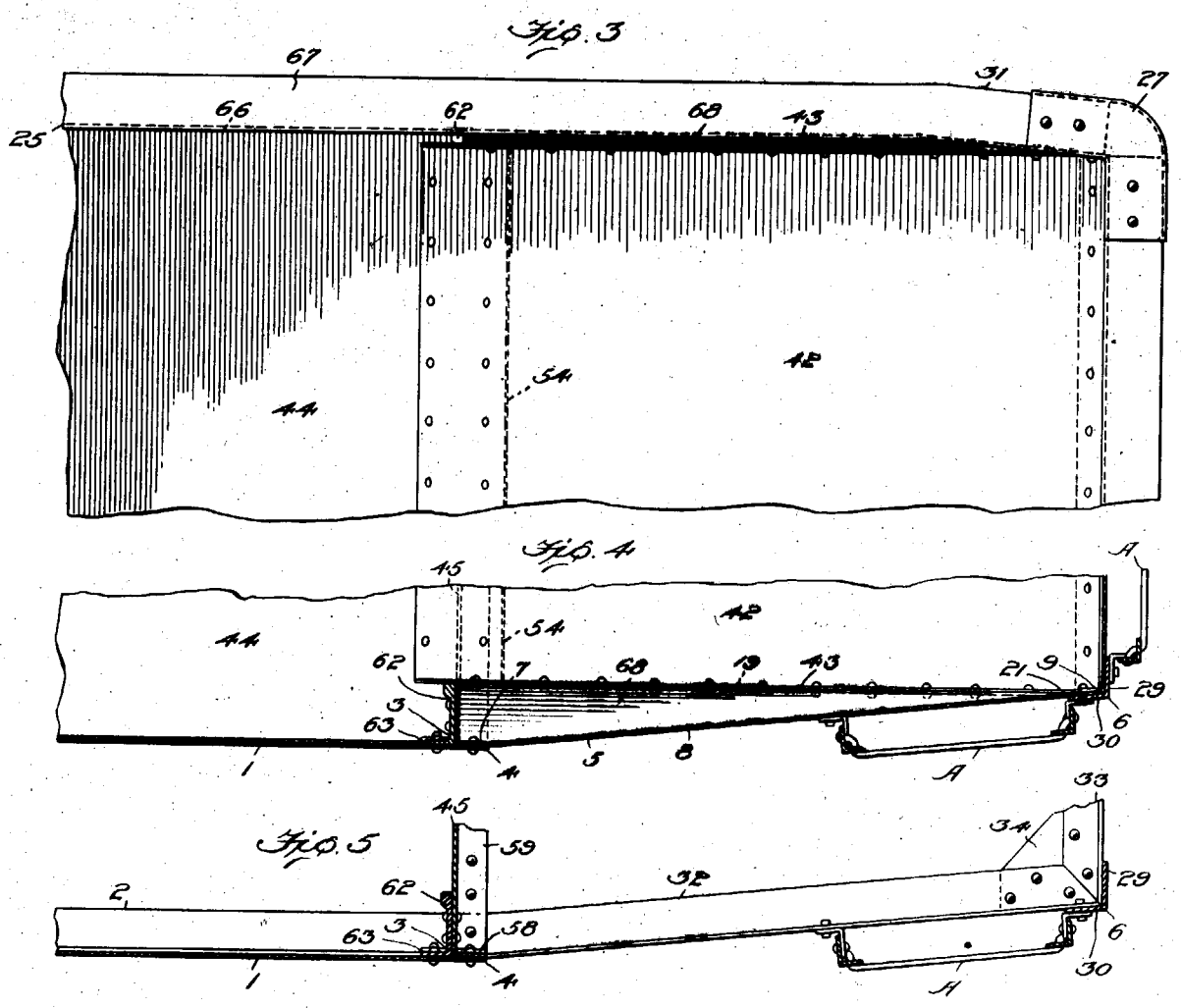
Inventor
William E. Wine
By
Potter & Mechlin
his Attorneys Feb. 11, 1930. W. E. WINE Re. 17,590

FREIGHT CAR

Original Filed May 23, 1927 7 Sheets-Sheet 4

Inventor

William E. Wine

Potter & Mechlin his Attorneys

Feb. 11, 1930. W. E. WINE Re. 17,590.

FREIGHT CAR

Original Filed May 23, 1927 7 Sheets-Sheet 5

Inventor

William E. Wine by Ritter & Mecklin his Attorneys

Feb. 11, 1930. W. E. WINE Re. 17,590

FREIGHT CAR

Original Filed May 23, 1927 7 Sheets-Sheet 6

Inventor

William E. Wine

Ritter & Meeklin his Attorneys

Feb. 11, 1930. W. E. WINE Re. 17,590

FREIGHT CAR

Original Filed May 23, 1927 7 Sheets-Sheet 7

Inventor

William E. Wine

By Potter & Meehlin his Attorney

Reissued Feb. 11, 1930

Re. 17,590

UNITED STATES PATENT OFFICE

WILLIAM E. WINE, OF TOLEDO, OHIO

FREIGHT CAR

Original No. 1,698,866, dated January 15, 1929, Serial No. 193,612, filed May 23, 1927. Reissue No. 17,285, dated April 23, 1929, Serial No. 348,369, filed March 19, 1929. This application for reissue filed September 17, 1929. Serial No. 393,254.

My invention relates to new and useful improvements in railway cars and more particularly to freight cars of the hopper type. One of the principal objects of the invention is to provide a hopper car having slightly reduced ends so that safety appliances may be applied on the sides of the car adjacent its ends and thus come within the limits defined by the maximum distance between the sides of the car.

Another object of the invention is to provide the interior of the car with means whereby the flow of granular lading or the like down the inclined floor thereof will not be interrupted by the stakes of the car which are disposed on the inside thereof.

Still another object of the invention is to provide a hopper car with end side sheets which can be readily formed from a single piece of metal so that they may be made up in large quantities on presses with which railroad shops and repair shops are usually equipped.

Still another object of the invention is to provide the hopper car with stamped end sheets, the body portions of which extend at a slight angle to one end thereof and the upper portions of which incline upwardly and inwardly.

A still further object of the invention is to provide the end side sheets with portions adjacent their lower edges which incline inwardly transversely of the car.

A still further object of the invention is to provide the freight car with brackets secured to the side stakes and end side sheets to tie these parts of the car structure together.

A still further object of the invention is to provide the end side sheets along their lower edges with flanges adapted to be secured to the slope sheets to support the latter.

A still further object of the invention is to provide a freight car with a body bolster having upwardly projecting ends presenting or affording surfaces above and below adjacent portions of the car floor to which side stakes may be secured.

With these and numerous other objects in view, the invention consists in certain new and novel arrangements and combinations of parts as will be hereinafter more fully described and pointed out in the claims.

In the drawings illustrating a preferred embodiment of the invention:

Figure 1 is a side elevational view of one end of the freight car.

Figure 2 is a fragmentary sectional view on line 2—2, Figure 1.

Figure 3 is a fragmentary plan view illustrating the side of the car opposite to that shown in Figure 2.

Figure 4 is a fragmentary sectional view taken on line 4—4, Figure 1.

Figure 5 is a similar view taken on line 5—5, Figure 1.

Figure 6:
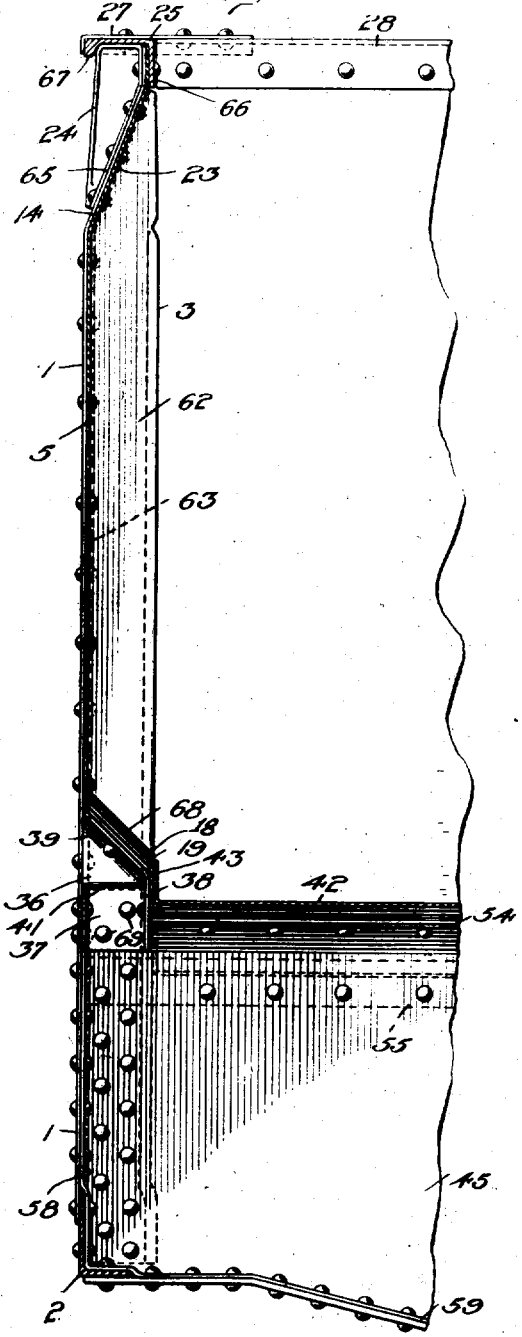
Figure 6 is a fragmentary sectional view taken on line 6—6, Figure 1.
Figure 7:
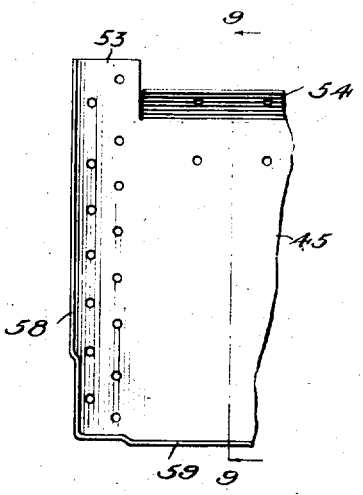
Figure 7 is a fragmentary side elevational view of one end of the bolster.
Figure 8:
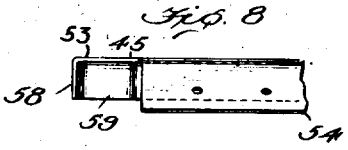
Figure 8 is a plan view of that portion of the bolster illustrated in Figure 7.
Figure 9:
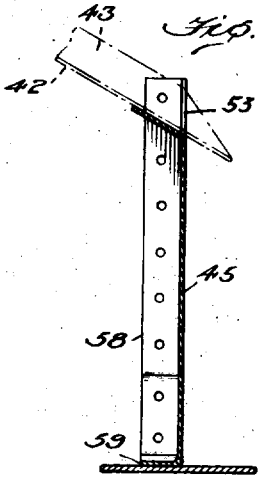
Figure 9 is a sectional view taken on line 9—9, Figure 7, the bottom cover plate of the bolster also being shown in section.
Figure 10:
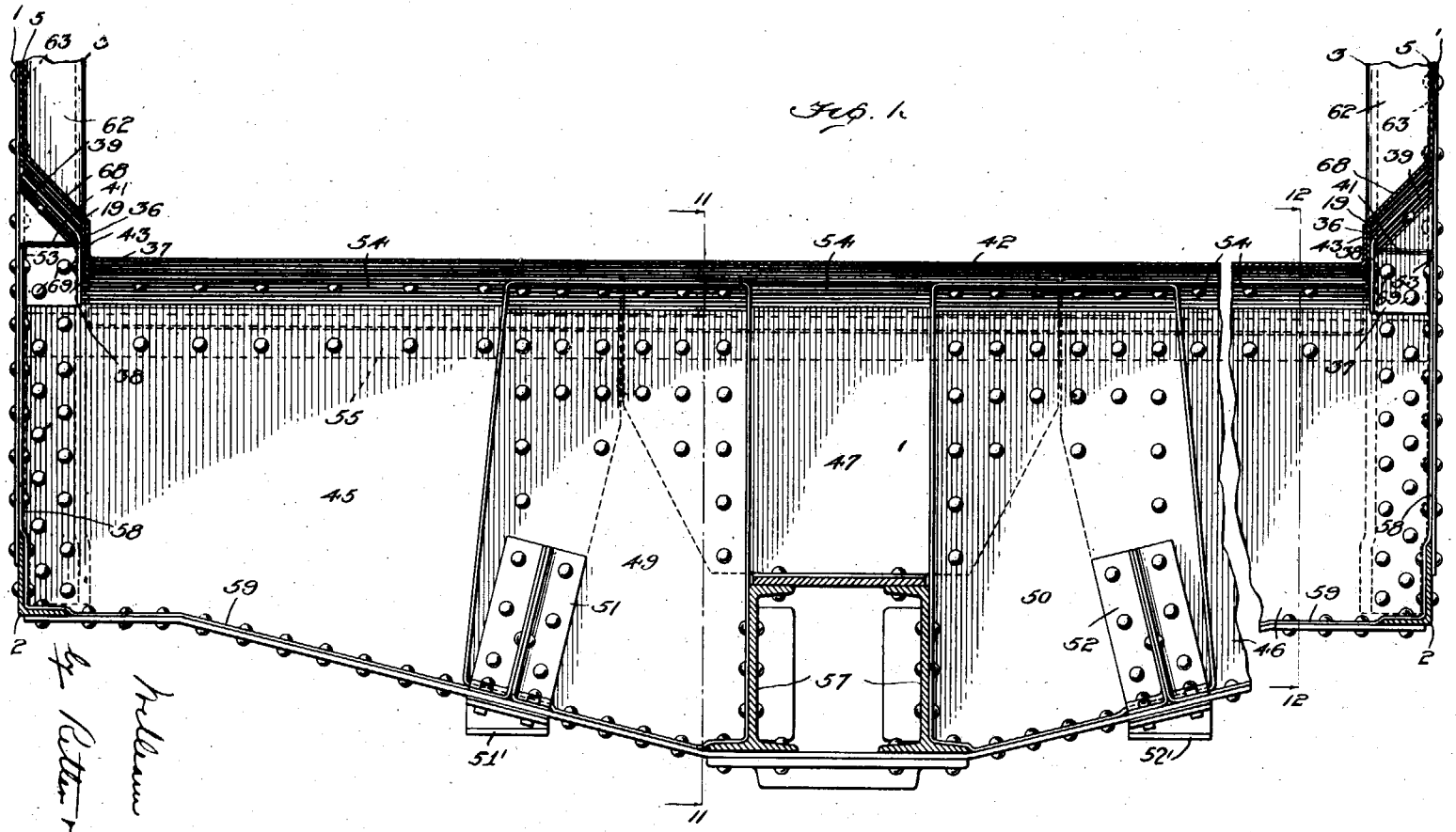
Figure 10 is a fragmentary vertical sectional view similar to Figure 6 showing substantially the entire bolster.
Figure 11:
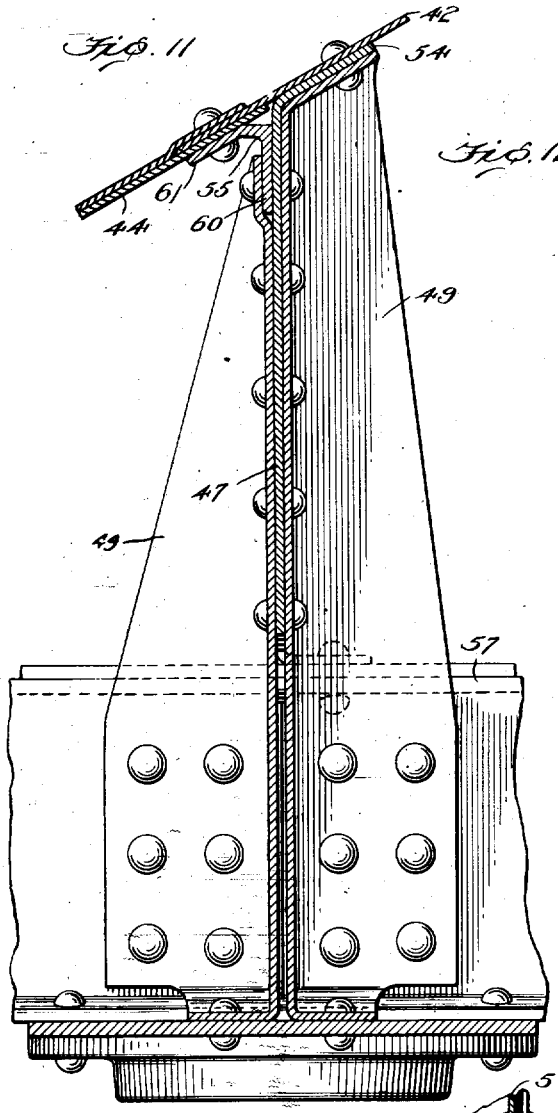
Figure 11 is an enlarged sectional view taken on line 11—11, Figure 10.
Figure 12:
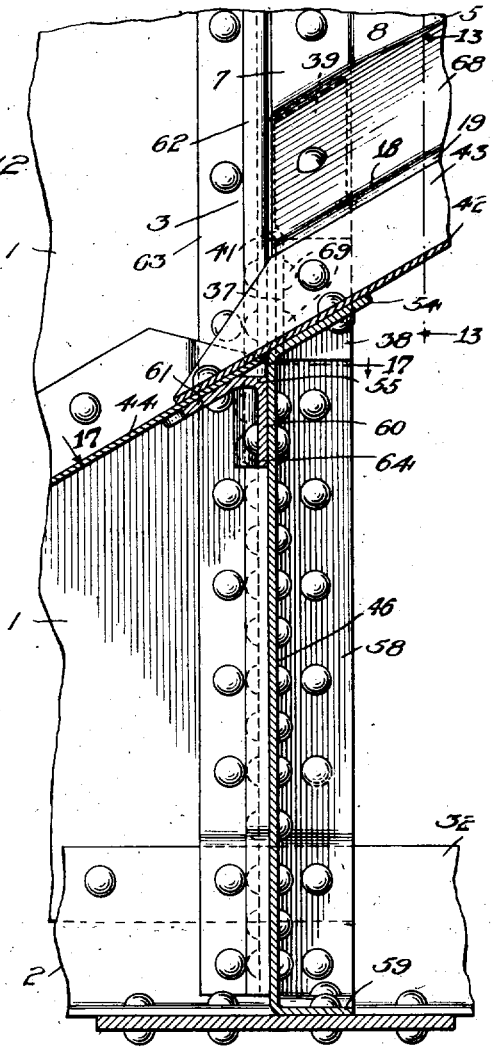
Figure 12 is a similar sectional view taken on line 12—12, Figure 10.
Figure 13:
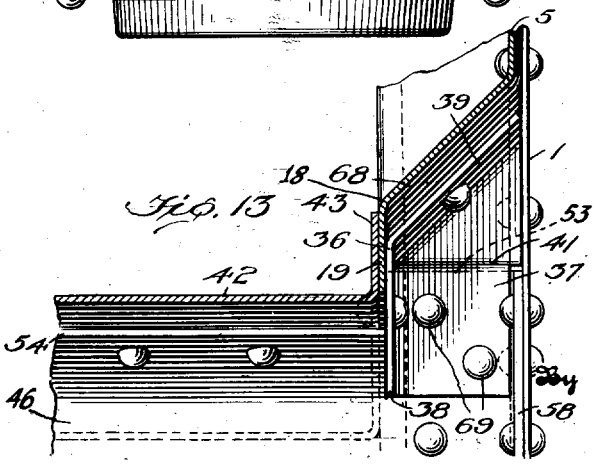
Figure 13 is a sectional view taken on line 13—13, Figure 12.
Figure 14:
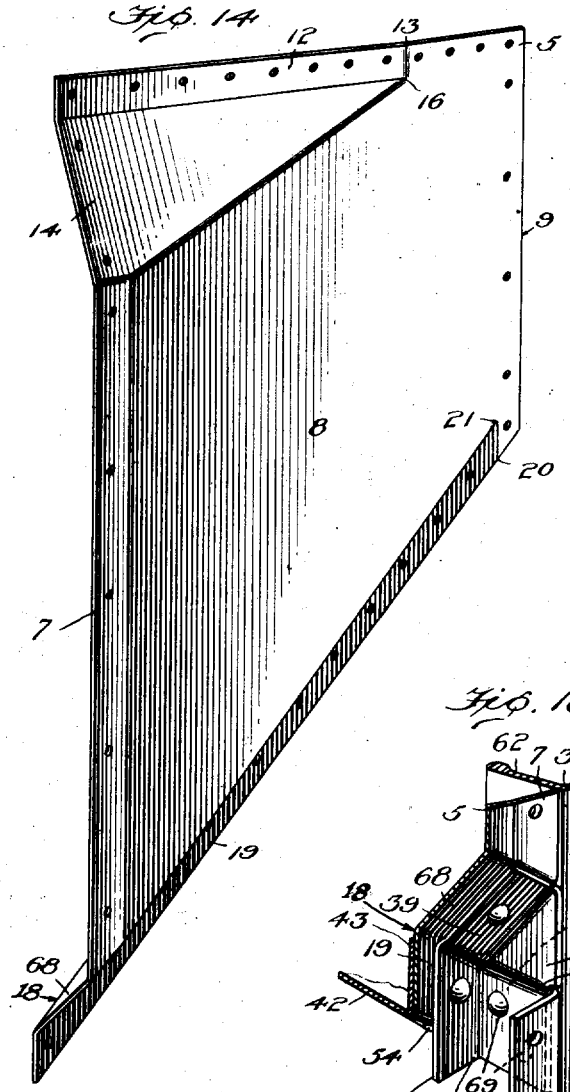
Figure 14 is a perspective view of one of the end side sheets.
Figure 15:
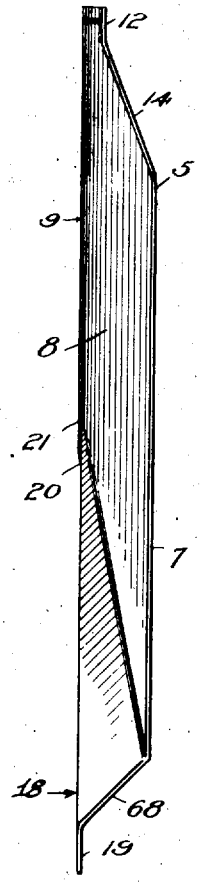
Figure 15 is an end view of the sheet illustrated in Figure 14.
Figure 18:
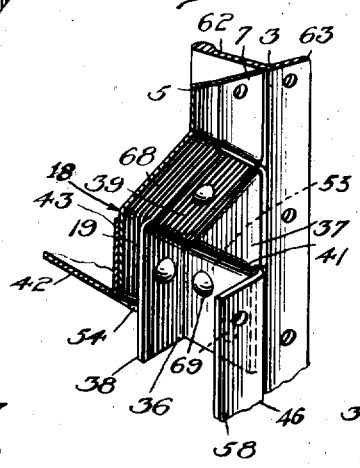
Figure 18 is a perspective view of the construction adjacent the upper end of the bolster illustrating the manner in which the bracket member ties together adjacent portions of the side and slope sheets, side stake and bolster.

As the construction adjacent each end of the car is the same, only one end thereof has been illustrated in the drawings and described in the specification. Furthermore, since the construction on opposite sides of the car is identical in all material aspects, only one side thereof will be described in the specification.

Referring more particularly to the drawings, 2 designates the side sills, 57 the center sills and 33 the end sills. The side and end sills, which are preferably of angle shape, may be advantageously secured by gussets 34, while the center sills may be tied to the end sills of the car in any suitable manner not shown.

The body bolster which is rigidly connected to the opposite side sills 2 and the center sills 57 is preferably of the composite type involving end plates 45 and 46 and a center plate 47. The outer side edges and the bottom edges of the end plates of the bolster preferably terminate in laterally extending flanges 58 and 59, respectively, and the portions of these flanges adjacent the side sills are rigidly connected thereto. The three plates of the bolster may be conveniently connected by two pairs of reinforcing plates 49 and 50, respectively, disposed on opposite sides of the center sills, the plates of each pair overlapping opposite faces of the bolster plates. Reinforcing brackets 51 and 52 may, if desired, be secured to the bolster directly over the bearing plates 51′ and 52′ which are adapted to co-operate with truck side bearings, not shown. The construction of the bolster thus far described is substantially the same as that disclosed in my Patent No. 1,703,758 and need not, therefore, be herein described more in detail.

The upper edges of each of the bolster plates 45, 46 and 47 are inclined upwardly so as to form a substantially continuous flange 54 which terminates slightly inwardly of the ends of the bolster. Connecting the bolster plates adjacent their upper portions is an angle member 55, one leg 60 of which is secured to the bolster plates and the other leg 61 of which projects laterally thereof in a direction opposite to that of the flange 54. The upper surface of the leg 61 is inclined similarly to that of flange 54 and lies in a plane substantially parallel therewith. These two flanges, as will hereinafter appear, afford a support for the inclined floor of the car.

Figure 17:
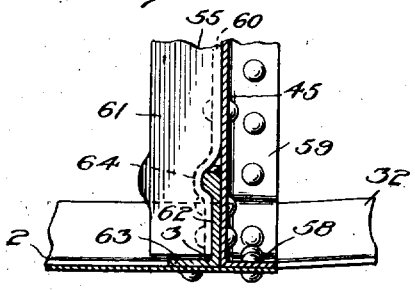
Figure 17 is a fragmentary sectional view taken on line 17—17, Figure 12.
Figure 16:
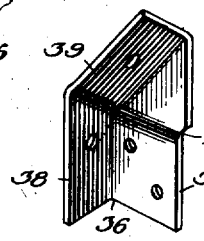
Figure 16 is a perspective view of the bracket or tie plate.

Secured to the sides of the bolster adjacent its respective ends are side stakes 3 which project upwardly therefrom within the sides of the car. Each of the side stakes may advantageously be a bulb angle having one leg or flange 62 riveted to a face of the bolster and another leg or flange 63 projecting laterally thereof in substantially the same plane as the adjacent side flange 58 of the bolster. As may be clearly seen in Figure 17, a portion of the leg 62 of the side stake is interposed between the face of the bolster and the connecting angle member 55, the latter being offset, as at 64, to overlie the leg. The end portions of the bolster to which the side stakes are respectively secured project upwardly, as at 53, above the flange 54 thereof and consequently above adjacent portions of the car floor. These upwardly projecting extensions 53 provide the bolster with increased areas to which the side stakes may be secured, thereby permitting the employment of a greater number of connecting rivets. Since a major portion of the force required for supporting the lading within the car is transmitted to the side stakes and thence to the body bolster, it will be readily appreciated that by virtue of being able to use a greater number of rivets to connect the side stakes and bolster a more rigid car construction is produced.

Each of the side sheets 1 of the car, with the exception of the end side sheets 5 which will be hereinafter described, overlaps the outer faces of and is secured to the respective legs 63 of the side stakes and to adjacent portions of the side sills 2. The edges of those side sheets 1 which adjoin the end side sheets 5 preferably project, as at 4, beyond their adjacent side stakes toward the ends of the car to afford convenient means to which the end side sheets may be attached. Adjacent their upper portions the side sheet 1 and the outer faces of the side stakes 3 incline upwardly and inwardly as at 65 and 23, respectively. These inclined portions 65 of the side sheets terminate in upwardly projecting substantially vertical flanges 26 for attachment to a vertical leg or flange 66 of an adjacent side top rail 25. The top rails of the car may conveniently be bulb angles having, in addition to the vertical flange 66, an outwardly projecting, substantially horizontal leg or flange 67 disposed above the inclined portions of the side sheets. Brackets 24 may advantageously be employed for reinforcing this top construction of the car. These brackets are respectively disposed on the outer face of the inclined portions of the side sheets, being riveted thereto and to the inclined portion of the side stakes and to the outwardly projecting flange 67 of the top rail. The end top rails 28 of the car are similar in shape to the side top rails and may be rigidly connected thereto in any desired manner such as by corner plates or brackets 27.

By fashioning the side sheets 1 of the car with the upwardly and inwardly inclined portions and by arranging the top rails of the car in the manner disclosed it will be readily appreciated that a car of maximum width is obtained in which all relatively sharp angles and pockets usually present on the inside of the top construction of the car are entirely eliminated—thereby facilitating the discharge of lading from the car when it is inverted for that purpose.

In order that ladders A and other safety appliances may be applied to the side of the car adjacent its ends and not project beyond the limits defined by the maximum distance between the sides of the car, the ends thereof are reduced or restricted. As may be clearly seen in Figures 2 to 5, inclusive, the corner posts 6 of the car, which may advantageously be of angle shape, are disposed inwardly with respect to the adjacent side stakes, being secured at their lower ends to the end sills 33 and to the inwardly inclined portions 32 of the side sills and at their upper ends to the top rails 25 and 28. The end side sheets 5 of the car respectively extend from the corner post 6 to the neighboring side stakes and each is provided with a main body portion 8 which inclines inwardly with respect to the parallel or normal sides of the car. Adjacent their inner vertical edges each side sheet is fashioned with a marginal flange 7 which is disposed in a plane parallel with the car side and is overlappingly secured to the inner face of the projecting portion 4 of the adjacent side sheet 1. Since the marginal flange 7 is parallel with the sides of the car it will be appreciated that it extends at an angle to the body portion 8 of the sheet. Adjacent their outer vertical edges 9 each end sheet overlaps the inner face of the leg or flange 30 of the adjacent corner post and is secured thereto by any suitable means, such as rivets. As the portion of the sheet which is secured to the leg 30 of the corner post lies in the same plane as the body portion 8 of the sheet, this leg is preferably disposed at an obtuse angle with the other leg or flange 29 of the corner post.

The upper portion of each of the end side sheets is fashioned with an inwardly and upwardly inclined or trough portion 14 which is in alinement with and constitutes a continuation of the inclined portions 65 of the adjacent side sheets 1. As the planes of these inclined portions intersect the body portions 8 of the end side sheets inwardly of their outer edges 9, the inclined portions 14 of the latter sheets gradually decrease in width and merge with the body of the sheet at a point 16. The upper edge of each end side sheet is fashioned with a substantially vertical flange 12 which extends at an angle to the body portion of the sheet for attachment to the depending leg 66 of the side top rail. This flange merges with the body portion of the sheet at a point 13 in vertical alinement with the point of mergence of the inclined portion 14 thereof. In order that the upper edge of the body portion of the sheet between the point 13 and its outer edge 9 may be also secured to the side top rail, the latter inclines slightly inwardly, as may be clearly seen at 31 in Figure 3.

The end side sheets 5 do not extend down to the side sills, as do the side sheets 1, but terminate substantially in the plane of adjacent portions of the inclined floor of the car, as clearly shown in Figure 1. The lower portions of each of the end side sheets are inclined downwardly and inwardly from adjacent the outer edge of the adjoining side stake to adjacent the inner edge thereof to provide the interior of the car with transversely inclined portions or troughs 68 in alinement with the side stakes longitudinally of the car. The inclined portion 68, in addition to being inclined transversely of car, is also inclined longitudinally thereof, and the lower edge 18 of the incline has substantially the same inclination as the inclined floor. It will thus be appreciated that, when the lading of the car is being discharged therefrom through drop doors in the bottom thereof, these transversely inclined portion of the end side sheets will cause portions of the lading, which would otherwise be pocketed or retained by the inwardly disposed side stakes, to readily pass around them, whereby the discharge of lading from the car is greatly facilitated.

As with the upper inclined portion 14 the lower inclined portion 68 of each end side sheet gradually decreases in width toward the outer edge thereof, merging with the body portion 8 at a point 21 which is intermediate the point of mergence of the upper incline 14 and the outer edge 9. The lower inclined portion 68 terminates in a substantially vertical flange 19 affording convenient means to which adjacent portions of the car floor may be attached. This lower flange is parallel with the upper flange 12 and with the side sheets 1 of the car and, therefore, forms an angle with the body portion 8 of the sheets, preferably merging therewith at a point 20 in vertical alinement with 21, the point of mergence of the lower incline. It will, of course, be understood that the points where the upper and lower inclined portions of each end side sheet merge with the body portion thereof are practically entirely determined or controlled by the inclination of the body portion thereof with respect to the parallel or normal sides of the car.

The floor of the car at each end thereof, instead of being one continuous slope sheet extending from the end of the car downwardly toward the center sills, may advantageously be formed of a plurality of sheets 42 and 44, the sheet 42 extending from the car end to the bolster and sheet 44 extending from the bolster to the center sills. The slope sheet 44 overlaps the inclined upper face of and is secured to the flange or leg 61 of the angle member 55, while the slope sheet 42 overlaps the upper face of the flange 54 of the bolster and the upper face of the adjoining portions of the slope sheet 44, being rigidly secured to both of them. The marginal edges of the slope sheet 42 are flanged upwardly as at 43, affording convenient means for attaching it to the lower flanges 19 of the end side sheets which are offset inwardly with respect to the main sides of the car. The slope sheet 44 which is of greater width than the sheet 42 is also provided with upwardly projecting marginal flanges for attachment to adjacent portions of the side sheets 1. As the lower marginal flanges 19 of the end side sheets are disposed in planes parallel with the normal sides of the car it will be appreciated that the adjacent slope sheet 42 may be of retangular form. Furthermore, since these flanges of the end side sheets are disposed adjacent the inner edges of the side stakes the necessity for cutting out or recessing the slope sheet 42 is eliminated. By being able to employ substantially rectangular floor or slope sheets the waste, incident to the use of irregularly shaped sheet metal pieces, is eliminated.

To support the inclined portions 68 of the end side sheets and to tie together the various parts of the car construction adjacent the ends of the bolsters, bracket members 36 may be advantageously employed. Each bracket member is provided with two legs, 37 and 38, respectively, disposed at substantially right angles to each other. The leg 37 is offset intermediate its ends at a point designated 41 affording surfaces respectively engageable with the associated upwardly projecting extension 53 of the bolster and an adjacent portion of a neighboring side stake. This leg is rigidly connected to the bolster and side stake by rivets 69, while the leg 38 is rigidly connected to the vertical flange 19 and the adjacent marginal flange 43 of the adjoining end side sheet and slope sheet respectively. At their upper edges the legs 37 and 38 are connected by a portion 39 disposed in a plane parallel with that of the inclined portions 68 of the end side sheets. This inclined portion 39 underlies and is in supporting engagement with the incline of the sheet and may, if desired, be riveted thereto. Thus it will be seen, that in addition to affording means for supporting the lower inclines of the end side sheets, the brackets 36 serve to rigidly tie together all portions of the car construction adjacent the upper ends of the bolster.

The foregoing construction results in the production of a car having a maximum capacity within the clearance limits prescribed by railroad standards. Furthermore, the manner in which the several parts of the car structure are connected produces a very rigid construction and the elimination of sharp angles and corners on the interior of the car greatly facilitates the discharge of lading therefrom whether this is accomplished by inverting the car or by opening the drop doors in the bottom thereof.

I claim:

1. A freight car having end side sheets converging to the end of the car from adjacent the body bolster, each of said sheets having a portion near its upper edge sloping inwardly and upwardly and a portion near its lower edge sloping inwardly and downwardly.

2. An end side sheet for a freight car involving a body portion, an ever widening trough, and a marginal flange merging with said body portion and said trough.

3. A freight car having an end side sheet provided with a marginal flange on its inner edge, the main body portion of the sheet extending at an angle to said flange, said sheet having a trough-like portion near its upper edge and a second trough-like portion near its lower edge.

4. An end side sheet for a freight car comprising a body portion, an ever widening trough formed in the lower portion thereof, and a marginal flange merging with the body portion and trough.

5. In a freigfiht car having vertical side sheets, and comibnation with end side sheets extending at an angle to said vertical side sheets, each of said end side sheets comprising a body portion, an ever widening trough in the upper portion thereof, and a marginal flange merging with the body portion and trough.

6. A freight car provided with side walls having end portions converging toward the end of the car, each of said end portions having an ever widening trough formed in its lower portion.

7. An end side sheet for a freight car comprising a body portion, an ever widening trough in the upper portion thereof, a marginal flange merging with the body portion and with the said trough, a second trough formed in the lower portion of the sheet, and a flange merging with the second trough and with the body portion near the outer edge thereof, the length of the lower trough being greater than the length of the upper trough.

8. An end side sheet for a freight car comprising a body portion, a marginal flange at one edge thereof, said body portion being inclined with respect to the marginal flange, a trough-like portion adjacent the upper end of the marginal flange, said trough merging with the sheet near the opposite edge thereof, and a second trough-like portion adjacent the lower end of the marginal flange, said second trough merging with the sheet beyond the point of mergence of the first named trough therewith.

9. A freight car having side walls and sloping floors, each of said side walls having and end portion lying in a plane forming an angle therewith affording means to which safety appliances may be secured, each of said end portions being fashioned adjacent its lower edge with an inwardly offset flange for attachment to adjacent portions of the sloping floors, said flanges being disposed in planes parallel to said side walls.

10. An end side sheet for a freight car comprising a body portion, an inwardly and upwardly inclined portion adjacent its upper edge, a top flange, the said inclined portion decreasing in width and merging with the said body portion and top flange, an inwardly and downwardly inclined portion adjacent its lower edge, and a flange merging with said last named inclined portion, the latter also decreasing in width.

11. A freight car having end side sheets converging to the end of the car from adjacent the body bolster, each of said sheets having a trough-like portion near its upper edge and a second trough-like portion near its lower edge.

12. A freight car provided with end side sheets having body portions converging toward each other and toward the end of the car to thereby provide spaces to which safety appliances may be attached, the upper portions of each of said sheets sloping upwardly toward each other and the lower portions of each of said sheets sloping downwardly toward each other.

13. A freight car provided with end side sheets having body portions extending slightly inwardly toward the end of the car affording means to which safety appliances may be secured, each of said sheets having a trough-like portion near its upper edge and a trough-like portion near its lower edge, a slope sheet, and flanges on said side sheets for attachment to said slope sheets.

14. A freight car having corner posts, side stakes spaced from said posts, end side sheets converging toward each other from adjacent the said stakes to said corner posts, trough-like portions formed respectively in the upper and lower portions of each of said sheets, each of said sheets being fashioned with a flange along its lower edge, and slope sheets, the latter being adapted to be respectively secured to the flange on said end side sheets.

15. A freight car involving four corner posts, side stakes spaced from said corner posts and positioned slightly outwardly thereof, end side sheets converging toward each other from adjacent the said side stakes to said posts, trough-like portions respectively formed in the lower portions of said end side sheets, and slope sheets respectively secured to said end side sheets.

16. A freight car having reduced ends, end side sheets inclined inwardly toward the reduced ends, trough-like portions of gradually decreasing width respectively formed in the lower portions of said end sheets, each of said sheets having a lower marginal flange merging with its trough-like portion, and slope sheets respectively secured to the said marginal flanges.

17. A freight car having its end side portions restricted, bulb angle stakes respectively defining the points of the beginning of the restriction, slope sheets extending from the restricted ends of the car toward the center thereof, and end side sheets extending respectively between the bulb angles and the ends of the car, and trough-like portions respectively formed in the lower portions of said end side sheets, said end side sheets serving to support said slope sheets.

18. A freight car having sides, corner posts, side stakes, end side sheets extending at an angle to the normal sides of the car and extending between the side stakes and corner ports, slope sheets, and flanges respectively formed on the end side sheets parallel to the said normal sides for supporting said slope sheets.

19. A freight car having sides, corner posts, bulb angle stakes adjacent the corner posts and positioned outwardly therefrom, end side sheets respectively extending between said stakes and corner posts, each of said end side sheets being provided with trough-like portions adjacent its upper and lower edges, brackets respectively engaging the under sides of said lower trough-like portions, said brackets being secured to adjacent side stakes, slope sheets, and means along the lower edges of the end side sheets for supporting said slope sheets.

20. A freight car provided with side stakes, corner posts positioned inwardly of said side stakes, the normal sides of the car extending between the side stakes, end side sheets extending between the end side stakes and the corner posts, a trough portion extending along the lower edge of each of said end side sheets, said trough portions being inclined with respect to the floor of the car, floor sheets extending from the ends of the car toward the center thereof, said floor sheets being secured to the end side sheets below the trough portions thereof, and a bracket secured to each of the end side stakes and contacting with the trough-like portion of the adjacent end sheet for tying the end side sheet and slope sheet to the side stake.

21. A freight car comprising side stakes, corner posts, end side sheets converging inwardly from the stakes to the corner posts, troughs respectively formed in the upper and lower portions of said sheets, each of said lower troughs terminating in downwardly projecting flanges, slope sheets respectively riveted to said flanges and brackets positioned on the side stakes for tying the slope sheets and end side sheets to their respective side stakes.

22. A freight car comprising in part a bolster, corner posts, side stakes extending above said bolster, end side sheets respectively provided with trough-like portions in their lower portions and with flanges merging with said trough-like portions, a slope sheet having flanges on its opposite sides respectively secured to the flanges on said end side sheets, means on the bolster for supporting one edge of said slope sheet, and brackets respectively secured to the stakes for tying the slope sheets and end side sheets to the bolster.

23. A freight car having reduced ends and converging end side sheets, a substantially rectangular slope sheet, the end side sheets having marginal flanges adapted to be secured for substantially their entire length to the said slope sheet, troughlike portions respectively formed in the upper and lower portions of each of said end side sheets, a bolster, side stakes, and a bracket on each of said stakes for tying the adjacent end side sheet, the slope sheet and the bolster to the respective side stakes.

24. A freight car comprising corner posts, side stakes spaced outwardly with respect to the corner posts, end side sheets respectively extending between the stakes and corner posts, a bolster provided with a flange on its upper edge, a slope sheet supported adjacent one of its edges by said flange, flanges on the sides of said slope sheet, flanges on the lower edges of said end side sheets respectively secured to the flanges on the slope sheets for supporting the sides of the latter, and brackets respectively riveted to the side stakes, to a portion of said bolster and to the adjacent flanges of said slope sheets and end side sheets 25. A freight car comprising in part a bolster having upwardly projecting ends, an upwardly inclined flange between the said ends, side stakes extending above said bolster, corner posts, end side sheets extending between said side stakes and corner posts, a slope sheet, said slope sheet secured to the lower edges of the respective end side sheets, the flange on said bolster serving to partly support said slope sheet, and brackets on said side stakes for respectively tying together the projecting ends of the bolster, the slope sheet, the adjacent end side sheet and side stake.

26. A freight car comprising in part end side sheets, a slope sheet supported by said side sheets, a bolster having upwardly projecting ends, and side stakes respectively secured to said ends of the bolster and projecting upwardly therefrom, and a bracket riveted to each of said end side sheets, the slope sheet and the adjacent projecting end of the bolster.

27. A freight car comprising sides and restricted ends, a slope sheet formed of two portions, the lower portion of which underlies the lower edge of the upper portion, means for supporting the overlapping edges of the slope sheet, end side sheets converging toward the end of the car from adjacent the overlapping edges of the said portions of the slope sheets and trough-like portions respectively formed in the end side sheets adjacent their lower edges, one of said portions of the slope sheet being riveted along its sides to the end side sheets.

28. A freight car having restricted ends, end side sheets, each being flared inwardly adjacent its upper and lower edges, side stakes, brackets having two substantially vertical legs and an inclined leg, said brackets being respectively secured to said side stakes and slope sheet, the inclined leg of each bracket abutting the lower flared portion of the adjacent end side sheet to rigidly support the same.

29. A freight car having side walls, sloping floors, said side walls having end portions converging inwardly toward the end of the car, each of said sloping floors having two substantially parallel flanges along each of its side edges adapted to be secured to the adjacent side wall, one of said flanges being disposed inwardly of the other, the converging end portions of each of said side walls having a flange along its lower edge for attachment to the inwardly disposed flange of the adjacent sloping floor.

30. A freight car having obtuse angle corner posts, bulb angle side stakes, angularly disposed end side sheets extending between the corner posts and adjacent side stakes, each of said end side sheets respectively having trough-like portions formed in its upper and lower portions, each of said side sheets also having a plurality of flanges, one of said flanges being adapted to be secured to an adjacent corner post, another to a top rail of the car and another to a slope sheet thereof.

31. A freight car having restricted ends, side sheets sloping inwardly and upwardly at their upper portions, end side sheets respectively having sloping portions registering with the sloping portions of adjacent side sheets, a top rail, means secured to the sloping portions of said side sheets for supporting the top rail, trough-like portions formed in the lower edges of the respective end side sheets, and slope sheets, the end side sheets supporting said slope sheets, the latter being secured to said end side sheets.

32. A freight car having side walls, sloping floors, said side walls having end portions converging toward the end of the car from adjacent the body bolster, each of said sloping floors having a plurality of flanges on each side edge thereof for attachment to adjacent portions of the side walls, one of said flanges being disposed inwardly of the other flange, each of said end portions of the side walls having a lower marginal flange for attachment to the adjacent inwardly disposed flange of the sloping floor.

33. A freight car having end side sheets converging toward the end of the car from adjacent the body bolster, a portion of each of said side sheets adjacent its lower edge being inclined downwardly and inwardly.

34. A freight car having end side sheets converging toward the end of the car from adjacent the body bolster, a lower portion of each of said side sheets being inclined downwardly and inwardly, each of said inclined portions being of varying width.

35. A freight car having an end side sheet, the marginal portion of the sheet remote from the end of the car being adapted to be secured to adjacent parts of the car construction, the main body portion of the sheet extending at an angle to the said marginal portion thereof and the lower portion of the sheet being inclined downwardly and inwardly.

36. An end side sheet for a freight car having a body portion adapted to be disposed in a plane forming an angle with the plane of the normal sides of the car and an ever widening downwardly and inwardly inclined portion formed in the lower part thereof.

37. An end side sheet for a freight car having an ever widening downwardly and inwardly inclined portion formed in the lower part thereof, said inclined portion terminating in a substantially vertical flange adapted to be disposed in a plane parallel with the normal sides of the car.

38. An end side sheet for a freight car having a body portion adapted to be disposed in a plane forming an angle with the normal sides of the car, an inwardly and upwardly inclined portion in the upper part thereof, and an inwardly and downwardly inclined portion in the lower part thereof, the incline in the lower part of the sheet extending for a greater distance than the incline in the upper part thereof.

39. A freight car having slope sheets and side sheets, each of said slope sheets having marginal flanges secured to side sheets, the end side sheets of the car converging towards the end of the car and being provided with angularly disposed inwardly offset portions for attachment to the adjacent flanges of the slope sheets.

40. A freight car having slope sheets and end side sheets converging toward the adjacent ends of the car, each of said end side sheets being provided with an inwardly and downwardly inclined portion terminating in a substantially vertical plane for attachment to the adjacent slope sheet.

41. In a drop-bottom railway car having reduced ends, end side sheets, side stakes projecting inwardly beyond said side sheets, and slope sheets secured to said side sheets, a portion of one of said sheets adjacent the other of said sheets in alinement with the side stakes longitudinally of the car being inclined transversely thereof.

42. A drop-bottom railway car involving a body bolster, a side stake secured to the bolster and extending upwardly therefrom within the sides of the car, a slope sheet, and a side sheet, a portion of one of said sheets adjacent the other of said sheets being inclined transversely of the car in alinement with the side stake longitudinally of the car, said incline being disposed in a plane intersecting the slope sheet in a line parallel with the normal sides of the car.

43. A drop-bottom railway car involving a body bolster, a side stake secured to the bolster and extending upwardly therefrom within the sides of the car, a slope sheet, and a side sheet attached to said slope sheet, one of said sheets adjacent its point of attachment to the other of said sheets having a portion inclined transversely of the car from adjacent one edge of the side stake to the opposite edge thereof.

44. In a drop-bottom railway car having side sheets, an inclined floor, and side stakes projecting inwardly beyond the side sheets, the lower portions of the end side sheets being inclined downwardly and inwardly in alinement with the side stakes longitudinally of the car.

45. In a drop-bottom railway car having an inclined floor, the combination with a plurality of side sheets, of body bolsters, and side stakes respectively secured to the bolsters adjacent their ends and projecting upwardly therefrom inside of said side sheets, portions of the side sheets adjacent the said floor and between the stakes and the ends of the car being inclined downwardly and inwardly in alinement with the side stakes longitudinally of the car.

46. In a drop-bottom railway car having an inclined floor, the combination with a plurality of side sheets, of a body bolster, and side stakes secured to the bolster adjacent its ends and projecting upwardly therefrom inside of said side sheets, portions of said side sheets adjacent the floor and between the side stakes and the adjacent end of the car being inclined inwardly and downwardly, said inclined portions respectively terminating in substantial alinement with the inner edges of adjacent side stakes longitudinally of the car.

47. In a drop-bottom railway car having an inclined floor, the combination with side sheets, of a body bolster, and side stakes respectively secured to the bolster adjacent the opposite ends thereof and extending upwardly therefrom inside of said side sheets, portions of the side sheets between the bolster and the adjacent end of the car being inclined transversely of the car from adjacent one edge of the associated side stake to adjacent the other edge thereof, each of said inclined portions terminating in a flange for attachment to the inclined floor.

48. A drop-bottom railway car involving side stakes within the sides of the car, a side sheet, a slope sheet, a portion of one of said sheets adjacent the other of said sheets being inclined transversely of the car in alinement with adjacent side stakes longitudinally of the car, and means for supporting the said inclined portion.

49. A drop-bottom railway car involving a side stake, a side sheet extending between the stake and the adjacent end of the car, a slope sheet connected to said side sheet, one of said sheets adjacent the other of said sheets being inclined transversely of the car in alinement with the side stake longitudinally of the car, and means associated with the side stake for supporting the said inclined portion.

50. A drop-bottom railway car involving body bolsters, side sheets, side stakes respectively secured to the bolsters adjacent their opposite ends and extending upwardly therefrom inside of said side sheets, slope sheets connected to the side sheets, portions of the sheets in alinement with the stakes longitudinally of the car and adjacent the ends thereof being inclined transversely of the car, and means rigidly united with the bolsters for respectively supporting said inclined portions.

51. A drop-bottom railway car involving a side stake, a side sheet between the stake and the adjacent end of the car, a slope sheet connected to the side sheet, a portion of one of said sheets being inclined transversely of the car in alinement longitudinally of the car with the side stake, and a bracket secured to the side stake for supporting the said inclined portion.

52. A freight car having side stakes, end side sheets provided adjacent their lower edges with portions inclined transversely of the car, slope sheets, and brackets respectively secured to said side stakes in supporting engagement with the under sides of said inclined portions.

53. A freight car involving side stakes, end side sheets provided adjacent their lower edges with portions inclined transversely of the car, said inclined portions terminating in flanges, slope sheets secured to said flanges, and brackets respectively secured to said side stakes in supporting engagement with the under sides of said inclined portions, each of said brackets being also secured to the adjacent end side sheet and slope sheet.

54. A freight car having a slope sheet, end side sheets, side stakes, and a bracket on each side stake for tying the adjacent end side sheet and the slope sheet to the associated side stake.

55. In a railway car having a floor, a body bolster disposed below the car floor and having end portions extending above the floor, and car side stakes respectively rigidly connected to the end portions of the bolster, said end portions presenting surfaces above and below the car floor to which the side stakes are respectively secured.

56. In a railway car, the combination with a body bolster having a top flange and end portions terminating above said flange, of side stakes respectively secured to said end portions, the latter affording surfaces above and below said flange to which the side stakes are respectively secured.

57. In a railway car having a floor, side sheets, a body bolster extending between said side sheets and disposed below the car floor, said bolster having end portions projecting above neighboring portions of the floor respectively affording surfaces normal to the longitudinal axis of the car to which car side stakes may be secured, and side stakes respectively secured to said end portions of the bolster and overlapping the inner faces of said side sheets.

58. In a railway car having a plurality of slope sheets, a body bolster disposed below said slope sheets, and having a portion projecting upwardly beyond neighboring portions of said slope sheets, a plurality of side sheets, and a side stake secured to the upwardly projecting portion of the bolster disposed inwardly of said side sheets, an edge of one of said slope sheets terminating adjacent the outer edge of the side stake and an edge of the other of said slope sheets terminating adjacent the inner edge thereof, one of said side sheets being flanged inwardly and secured to the marginal edge of said last named slope sheet.

59. In a railway car having a body bolster provided with an inclined top flange adapted to supportingly engage the under side of the car floor, side sheets, and side stakes respectively secured to said bolster adjacent opposite ends thereof and projecting upwardly therefrom inside of said side sheets, the portions of the bolster respectively secured to the side stakes being disposed on opposite sides of the inclined flange of the latter.

60. In a railway car having main side sheets and end side sheets, and side stakes disposed within the sides of the car defined by the said side sheets, portions of the main side sheets adjacent the end side sheets projecting beyond the associated side stakes to afford means for attaching the latter sheets to the main side sheets.

61. An end side sheet for a railway car having upper and lower substantially vertical marginal flanges, the body portion of the sheet intermediate said flanges being disposed in a plane forming an angle with the planes of said flanges.

62. In a railway hopper car having reduced ends, the combination with side sheets and inclined floor sheets, of side stakes projecting inwardly beyond the side sheets, portions of the sheets intermediate the car ends and adjacent side stakes in alinement with the latter longitudinally of the car being inclined transversely of the car, said inclined portions being disposed in planes intersecting the slope sheets in parallel lines.

63. In a railway hopper car having reduced ends, the combination with side sheets and inclined floor sheets, of side stakes projecting inwardly beyond the side sheets, the side sheets adjacent the end of the car being provided with transversely inclined portions in alinement with the side stakes longitudinally of the car, said inclined portions respectively terminating in flanges parallel with the normal sides of the car for attachment to the slope sheets.

64. In a hopper car having reduced ends, the combination with side sheets, of side stakes projecting inwardly beyond the side sheets, the lower portions of the side sheets adjacent the ends of the car being fashioned with transversely inclined surfaces in alinement with the side stakes longitudinally of the car, said last-named side sheets being fashioned with marginal flanges, and substantially rectangular slope sheets secured to said marginal flanges.

WILLIAM E. WINE.